(12) United States Patent
Wada

(10) Patent No.: US 9,931,788 B2
(45) Date of Patent: Apr. 3, 2018

(54) THREE-DIMENSIONAL MODELING APPARATUS AND MANUFACTURING METHOD

(71) Applicant: SEIKO EPSON CORPORATION, Tokyo (JP)

(72) Inventor: Hiroshi Wada, Nagano (JP)

(73) Assignee: Seiko Epson Corporation, Tokyo (JP)

(*) Notice: Subject to any disclaimer, the term of this patent is extended or adjusted under 35 U.S.C. 154(b) by 239 days.

(21) Appl. No.: 15/061,375

(22) Filed: Mar. 4, 2016

(65) Prior Publication Data
US 2016/0263825 A1 Sep. 15, 2016

(30) Foreign Application Priority Data

Mar. 13, 2015 (JP) ................................ 2015-050168

(51) Int. Cl.
B29C 67/00 (2017.01)
B29C 64/112 (2017.01)
B29C 64/386 (2017.01)
B33Y 10/00 (2015.01)
B33Y 30/00 (2015.01)
B33Y 50/02 (2015.01)

(52) U.S. Cl.
CPC ........ *B29C 67/0059* (2013.01); *B29C 64/112* (2017.08); *B29C 64/386* (2017.08); *B33Y 10/00* (2014.12); *B33Y 30/00* (2014.12); *B33Y 50/02* (2014.12)

(58) Field of Classification Search
CPC . B29C 64/386; B29C 64/112; B29C 67/0059; B33Y 30/00; B33Y 10/00; B33Y 50/20
See application file for complete search history.

(56) References Cited

U.S. PATENT DOCUMENTS

| 6,007,318 | A | 12/1999 | Russell et al. |
| 9,031,680 | B2* | 5/2015 | Napadensky ....... B29C 67/0059 700/98 |
| 2002/0167101 | A1 | 11/2002 | Tochimoto et al. |
| 2005/0001356 | A1 | 1/2005 | Tochimoto et al. |
| 2007/0007698 | A1 | 1/2007 | Sano |
| 2015/0035186 | A1* | 2/2015 | Teken .................. B41J 2/14145 264/40.4 |

(Continued)

FOREIGN PATENT DOCUMENTS

JP 2000-280357 A 10/2000
JP 2001-150556 A 6/2001
(Continued)

*Primary Examiner* — Nahida Sultana

(57) ABSTRACT

A three-dimensional modeling apparatus is provided with a head unit for modeling an object by discharging a liquid into each unit grille and a control unit for controlling the head unit. The control unit controls the head unit so as to discharge a designated type of colored liquid into a first unit grille out of two unit grilles adjacent to each other in a direction from a surface of the object to the interior, and discharge, into a second unit grille, one or more types of colored liquids that includes at least one colored liquid of the same type as the colored liquid discharged into the first unit grille, so as to be able to express a color of the surface of the object using the colored liquid discharged into the first unit grille and the one or more colored liquids discharged into the second unit grille.

6 Claims, 14 Drawing Sheets

(56) References Cited

U.S. PATENT DOCUMENTS

| | | | |
|---|---|---|---|
| 2016/0001504 A1* | 1/2016 | Ikeda | B29C 67/0059 264/255 |
| 2016/0075089 A1* | 3/2016 | Duro Royo | B29C 67/0088 264/308 |
| 2016/0250807 A1* | 9/2016 | Atwood | B33Y 10/00 264/401 |

FOREIGN PATENT DOCUMENTS

| | | |
|---|---|---|
| JP | 2005-067138 A | 3/2005 |
| JP | 2010-058519 A | 3/2010 |
| JP | 2011-073163 A | 4/2011 |

\* cited by examiner

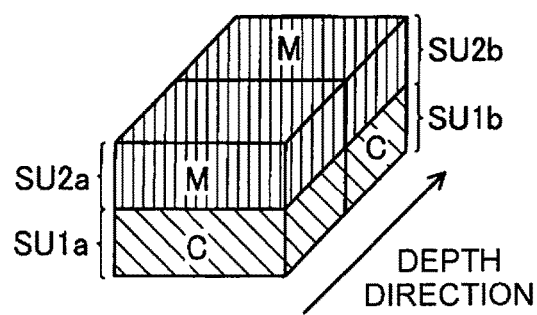
FIG. 6A
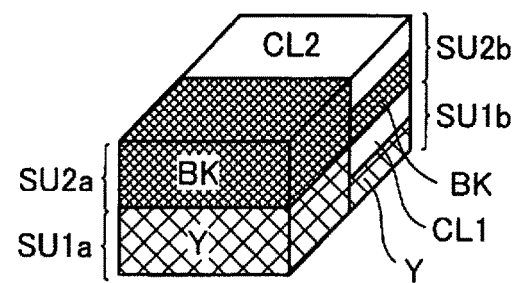
FIG. 6B
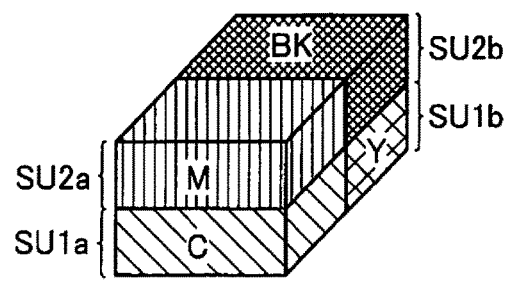
FIG. 6C
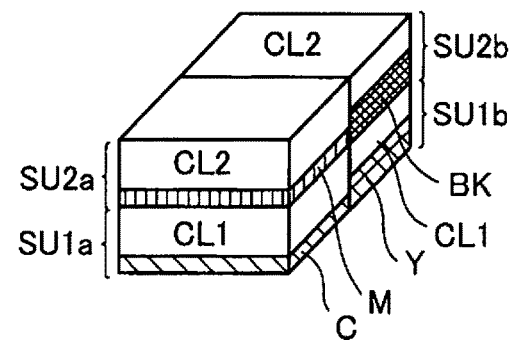
FIG. 6D
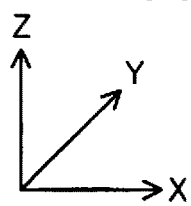

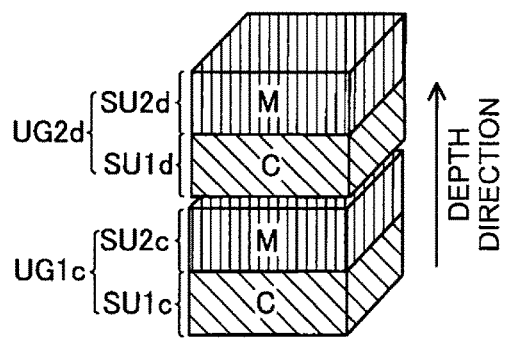
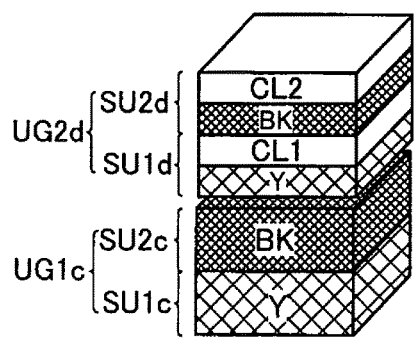
FIG. 7A  FIG. 7B
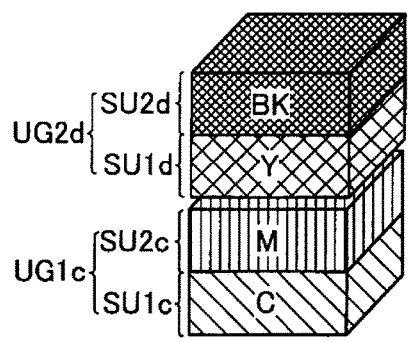
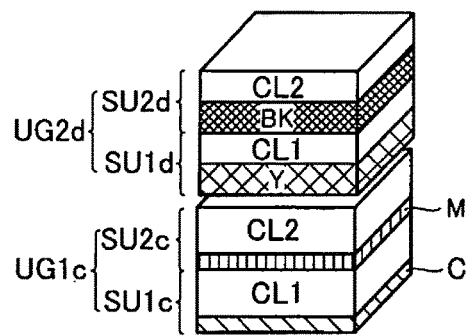
FIG. 7C  FIG. 7D

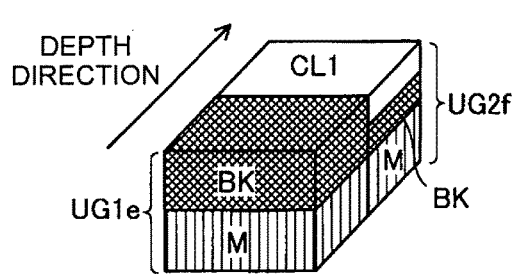
FIG.10A
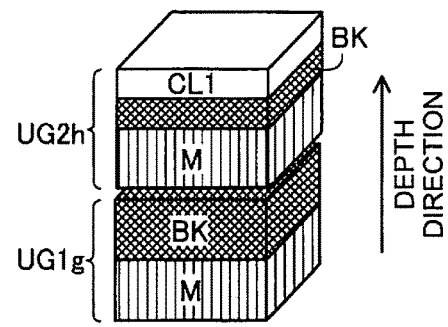
FIG.10D
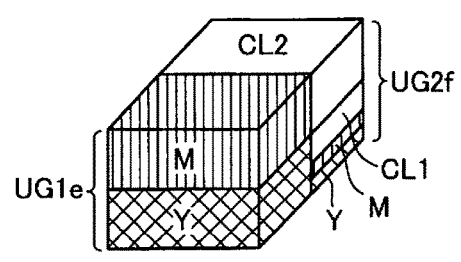
FIG.10B
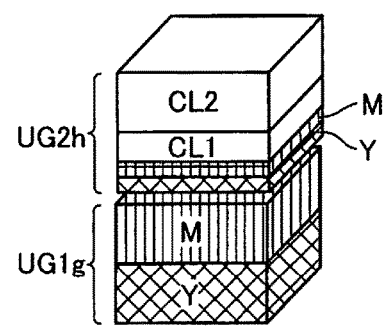
FIG.10E
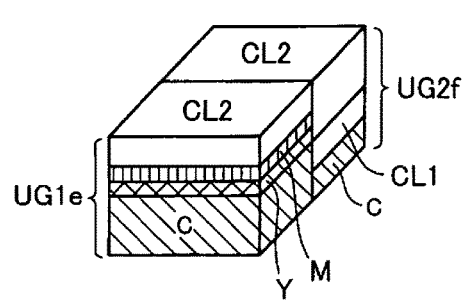
FIG.10C
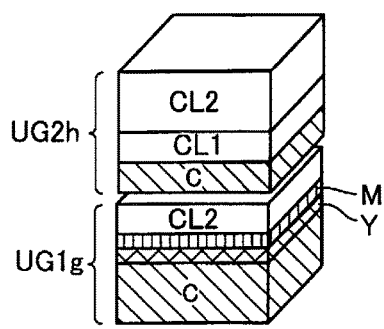
FIG.10F
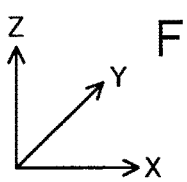

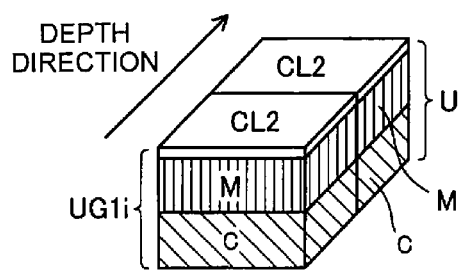
FIG.11A
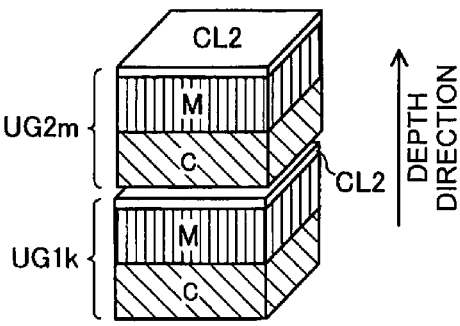
FIG.11D
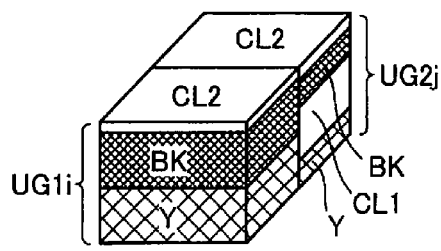
FIG.11B
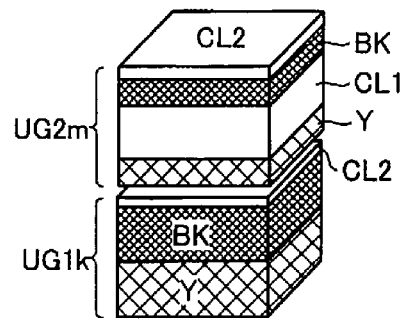
FIG.11E
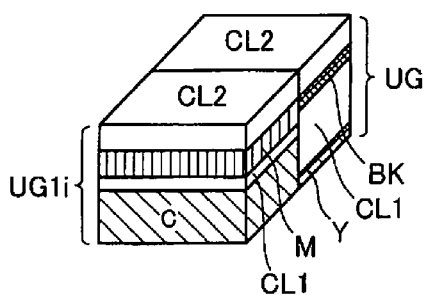
FIG.11C
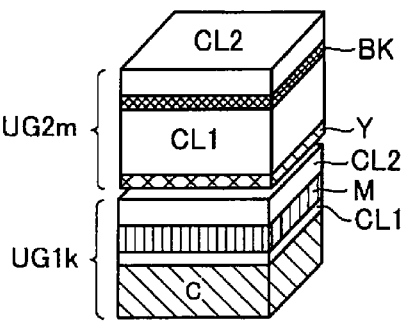
FIG.11F
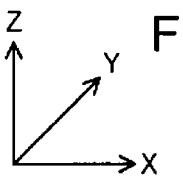

THREE-DIMENSIONAL MODELING APPARATUS AND MANUFACTURING METHOD

BACKGROUND

1. Technical Field

The present invention relates to a three-dimensional modeling apparatus.

2. Related Art

In recent years, three-dimensional modeling apparatuses that adopt an inkjet technique have been attracting attention. With three-dimensional modeling apparatuses that adopt an inkjet technique, a three-dimensional object is modeled by performing, over a number of layers in the height direction (Z direction), a step of discharging a liquid having curability and forming a cross section body for one layer that lies in the horizontal direction (XY directions). For example, with a three-dimensional modeling apparatus described in JP-A-2011-73163, the color intensity is expressed by superimposing layers in which a peripheral portion is colored and layers in which a peripheral portion is not colored.

JP-A-2011-73163, JP-A-2001-150556, JP-A-2005-67138 and JP-A-2010-58519 are examples of related art.

However, with the technique described in JP-A-2011-73163, only one color can be expressed for each layer, and therefore there is a problem in that, when observed from outside, color reproducibility deteriorates. Therefore, a technique that improves color reproducibility in a technique for modeling a colored three-dimensional object by discharging a liquid is demanded.

SUMMARY

An advantage of some aspects of the invention is to solve at least some of the above-described problems, and the invention can be achieved as the following modes.

(1) According to one mode of the invention, a three-dimensional modeling apparatus for modeling a three-dimensional object by laminating a plurality of cross section bodies in a Z direction is provided. This three-dimensional modeling apparatus includes: a head unit for modeling the object by discharging a liquid, which is to be a material of the object, into each unit grille that is defined in accordance with a modeling resolution of the cross section body in an X direction, a modeling resolution of the cross section body in a Y direction, and a lamination interval of the cross section body in the Z direction; and a control unit for controlling the head unit. The head unit is capable of individually discharging, into the unit grille, a colorless liquid and a plurality of types of colored liquids for expressing a designated color, and the control unit is configured to be able to control the head unit so as to discharge a designated type of colored liquid out of the plurality of types of colored liquids into a first unit grille positioned on a surface side of the object out of two unit grilles adjacent to each other in a direction from a surface of the object to the interior, and discharge, into a second unit grille positioned on an inner side of the object out of the two adjacent unit grilles, one or more types of colored liquids that includes at least one colored liquid of the same type as the colored liquid discharged into the first unit grille, so as to be able to express a color of the surface of the object using the colored liquid discharged into the first unit grille and the one or more colored liquids discharged into the second unit grille.

With the three-dimensional modeling apparatus of such a mode, the object is also colored in the depth direction thereof, whereby, color density observed from outside of the object can be more finely expressed. Therefore, the number of colors that can be expressed per unit area on the surface of the object can be increased, and color reproducibility can also be improved.

(2) In the three-dimensional modeling apparatus of the above mode, the unit grille may have a plurality of sub unit grilles aligned in the Z direction, the head unit may be capable of discharging a designated amount of each of the colorless liquid and the plurality of types of colored liquids into each of the sub unit grilles, and the control unit may control the head unit so as to discharge a designated type of colored liquid out of the plurality of types of colored liquids into each of the sub unit grilles, and in a case where the spatial volume of the sub unit grille is not filled with the colored liquid, controls the head unit so as to discharge the colorless liquid into the sub unit grille in addition to the colored liquid such that the spatial volume of the sub unit grille is filled.

With the three-dimensional modeling apparatus of such a mode, it is possible to adjust the amount of colored liquid to be discharged into the sub unit grille that is a unit finer than a unit grille that is in accordance with the modeling resolution, and it is possible to improve color reproducibility when modeling a colored three-dimensional object. In addition, in the above mode, in the case where the spatial volume of the sub unit grille is not filled with the amount of colored liquid discharged into the sub unit grille, the remaining spatial volume of the sub unit grille is filled with colorless liquid. Therefore, the volumes of the sub unit grilles are uniformized, and the volumes of the unit grilles are also uniformized. Therefore, the three-dimensional object can be accurately modeled.

(3) In the three-dimensional modeling apparatus of the above mode, the unit grille may have a first sub unit grille and a second sub unit grille positioned above the first sub unit grille in the vertical direction, the head unit may discharge the liquids into the unit grilles while scanning in a predetermined direction, and be provided with a plurality of nozzle groups for discharging the liquids, and in a main scanning direction of the head unit, a second nozzle group for discharging the colorless liquid into the first sub unit grille may be arranged rearward of a first nozzle group for discharging a colored liquid into the first sub unit grille, a third nozzle group for discharging a colored liquid into the second sub unit grille may be arranged rearward of the second nozzle group, and a fourth nozzle group for discharging a colorless liquid into the second sub unit grille may be arranged rearward of the third nozzle group.

With the three-dimensional modeling apparatus of this mode, after the first sub unit grille is filled with liquid discharged from the first nozzle group and the second nozzle group, the second sub unit grille can be filled with liquid discharged from the third nozzle group and the fourth nozzle group. Therefore, the spatial volume of each of the sub unit grilles can be filled with colorless liquid while adjusting the amount of colored liquid discharged into each of the first sub unit grille and second sub unit grille. Thereby, the volumes of the sub unit grilles can be more easily uniformized. In addition, because colored liquid discharged into the first sub unit grille is positioned in the lower portion of the first sub unit grille, and colorless liquid is positioned in the upper portion of the first sub unit grille, color reproducibility can be improved in the case where the lower side of the first sub unit grille is the surface side of the object.

(4) In the three-dimensional modeling apparatus of the above mode, the head unit may discharge the liquids into the unit grilles while scanning in a predetermined direction, and be provided with a plurality of nozzle groups for discharging the liquids, and in the main scanning direction of the head unit, a sixth nozzle group for discharging a colorless liquid into the unit grilles may be arranged rearward of a fifth nozzle group for discharging a colored liquid into the unit grilles, and a seventh nozzle group for discharging a colorless liquid into the unit grilles may be arranged rearward of the sixth nozzle group.

With the three-dimensional modeling apparatus of such a mode, for example, even in the case where the total amount of the colored liquid discharged from the fifth nozzle group is small, and the amount of colorless liquid necessary for filling the unit grille with liquid is greater than the amount that can be discharged from either the sixth nozzle group or the seventh nozzle group, it is possible to fill the unit grille with liquid by discharging the colorless liquid sequentially from the two nozzle groups, that is, the sixth nozzle group and the seventh nozzle group. Therefore, the volumes of the unit grilles can be more easily uniformized.

(5) In the three-dimensional modeling apparatus of the above mode, the control unit may control the head unit so as to discharge the colorless liquid and the colored liquids such that top portions of the liquids discharged into the first unit grille and the second unit grille are formed of the colorless liquid.

With the three-dimensional modeling apparatus of such a mode, the way that colored liquid discharged into a unit grille spreads in the unit grille can be uniformized, and color variation for each of the unit grilles can be reduced. In other words, the colored liquid discharged into the unit grille spreads differently after landing in the case of landing on colored liquid and in the case of landing on colorless liquid. Therefore, if the top portion of the unit grille is constituted by colorless liquid, it is possible to cause the colored liquid that is discharged into a unit grille above this unit grille to land on the colorless liquid. Accordingly, it is possible to uniformize the way that the colored liquid spreads after landing, and color variation due to the difference in way of spreading can be reduced.

The invention can also be achieved in various modes other than the modes as a three-dimensional modeling apparatus. For example, the invention can be achieved as a manufacturing method for manufacturing a three-dimensional object, a computer program for modeling a three-dimensional object under the control of the three-dimensional modeling apparatus, a non-transitory tangible recording medium on which the computer program is recorded, or the like.

BRIEF DESCRIPTION OF THE DRAWINGS

The invention will be described with reference to the accompanying drawings, wherein like numbers reference like elements.

FIGS. 6A to 6D are diagrams showing examples of unit grilles corresponding to side surface portions of an object.

FIGS. 7A to 7D are diagrams for explaining a method for expressing a color of a bottom surface of an object.

FIGS. 10A to 10F are diagrams showing examples of unit grilles in the second embodiment.

FIGS. 11A to 11F are diagrams showing examples of unit grilles in a third embodiment.

DESCRIPTION OF EXEMPLARY EMBODIMENTS

A. First Embodiment

Figure 1:
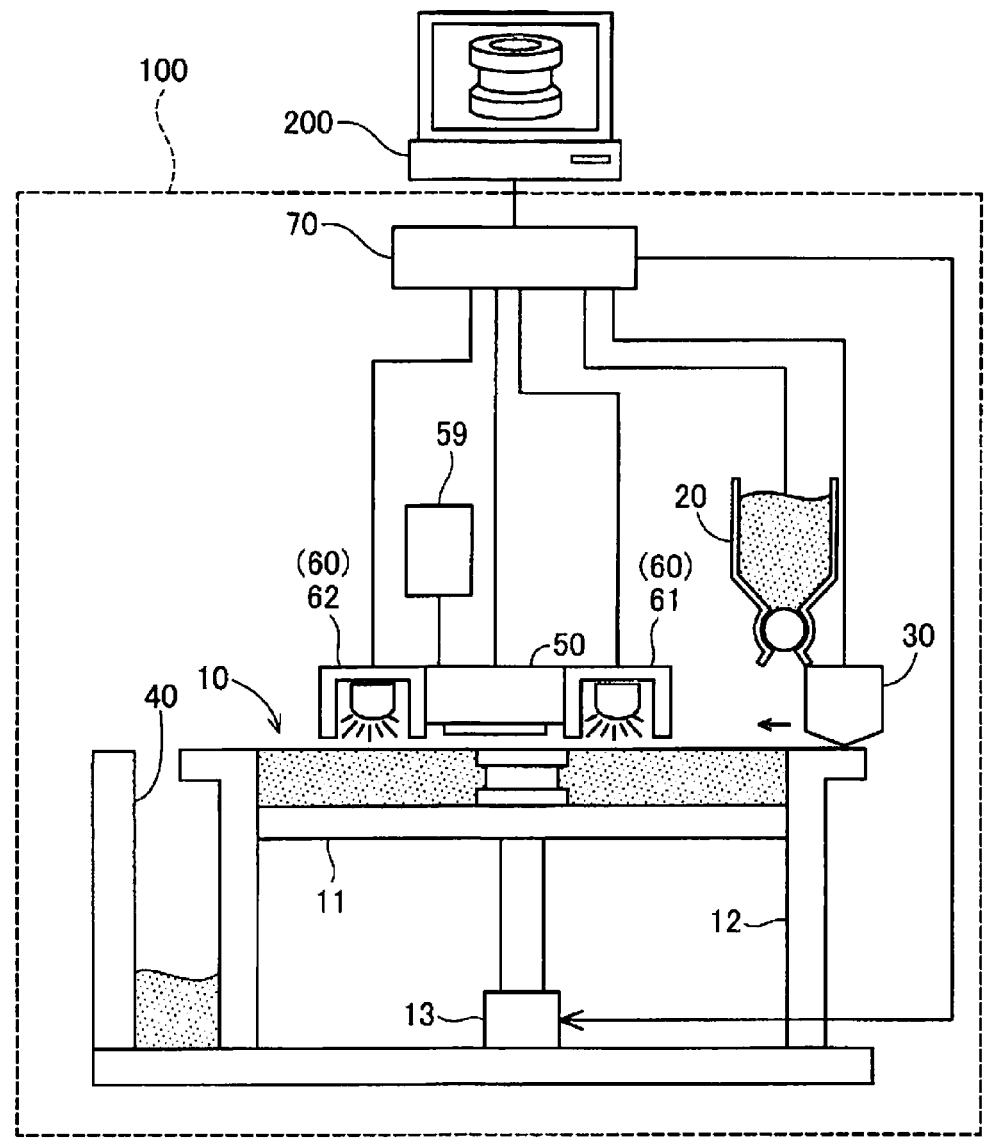
FIG. 1 is an explanatory diagram showing a schematic configuration of a three-dimensional modeling apparatus as a first embodiment.

FIG. 1 is an explanatory diagram showing the schematic configuration of a three-dimensional modeling apparatus as a first embodiment of the invention. A three-dimensional modeling apparatus 100 is provided with a modeling unit 10, a powder supply unit 20, a flattening mechanism 30, a powder collecting unit 40, a head unit 50, a curing energy applying unit 60, and a control unit 70. A computer 200 is connected to the control unit 70. The three-dimensional modeling apparatus 100 and the computer 200 can be collectively regarded as a "three-dimensional modeling apparatus" in a broad sense. In FIG. 1, an X direction, a Y direction and a Z direction that intersect orthogonally to one another are shown. The Z direction is a direction along a vertical direction, and the X direction is a direction along a horizontal direction. The Y direction is a direction perpendicular to the Z direction and the X direction.

The modeling unit 10 is a tank-shaped structure in which a three-dimensional object is modeled. The modeling unit 10 is provided with a modeling stage 11 that is flat and lies in an XY direction, a frame body 12 surrounding the periphery of the modeling stage 11 and erect in the Z direction, and an actuator 13 for moving the modeling stage 11 in the Z direction. The modeling stage 11 moves in the Z direction in the frame body 12 by the control unit 70 controlling the operations of the actuator 13.

The powder supply unit 20 is an apparatus for supplying powder into the modeling unit 10. The powder supply unit 20 is constituted by a hopper or a dispenser, for example.

The flattening mechanism 30 is a mechanism for flattening the powder supplied into the modeling unit 10 or on the frame body 12 and forming a powder layer on the modeling stage 11 by moving over the upper surface of the modeling unit 10 in the horizontal direction (XY directions). The flattening mechanism 30 is constituted by a squeegee or a roller, for example. The powder pushed out from the modeling unit 10 by the flattening mechanism 30 is discharged into the powder collecting unit 40 provided adjacent to the modeling unit 10.

The three-dimensional modeling apparatus 100 in the first embodiment uses a liquid having curability (hereinafter, referred to as "curable liquid") and the above powder as materials of a three-dimensional object. A mixture of a liquid resin material that is mainly composed of monomers and oligomers to which monomers are bonded, and a polymerization initiator that enters an excited state when irradiated with ultraviolet light, and acts on the monomers or the oligomers so as to start polymerization is used as a curable liquid. In addition, as the monomers of the resin material, relatively low molecular weight monomers are selected, and furthermore, the number of monomers included in one oligomer of the resin material is adjusted to be about a few molecules such that the curable liquid has a low viscosity that allows droplets to be discharged from the head unit 50. This curable liquid has a property of quickly curing and becoming a solid when the curable liquid is irradiated with ultraviolet light and the polymerization initiator is in an excited state, the monomers polymerize with one another and grow into oligomers, and the oligomers also polymerize with one another in places.

In this embodiment, powder particles on the surface of which a polymerization initiator of a different type from that contained in the curable liquid are attached is used as the powder. The polymerization initiator attached to the surface of the powder particles has a property of acting on the monomers or the oligomers so as to start polymerization when coming into contact with the curable liquid. Therefore, when the curable liquid is supplied to the powder in the modeling unit 10, the curable liquid permeates into the powder, comes into contact with the polymerization initiator on the surface of the powder particles, and cures. As a result, in a portion onto which the curable liquid is discharged, powder particles are coupled with one another by the curable liquid that has cured. Note that in the case of using, as the powder, powder particles having a polymerization initiator attached to the surface thereof, a curable liquid that does not contain a polymerization initiator can also be used.

The head unit 50 is an apparatus that receives supply of the above-described curable liquid from a tank 59 connected to the head unit 50 and discharges, in the Z direction, the curable liquid onto the powder layer in the modeling unit 10. In this embodiment, the head unit 50 can discharge, as the curable liquid, colorless ink that has not been colored, and a plurality of types of colored ink that has been colored. The head unit 50 can move in the X direction and the Y direction with respect to the three-dimensional object that is modeled in the modeling unit 10. In addition, the head unit 50 can move in the Z direction relative to the three-dimensional object, by the modeling stage 11 inside of the modeling unit 10 moving in the Z direction.

The head unit 50 of this embodiment is a so-called piezoelectric drive type droplet discharging head. By filling a pressure chamber having a minute nozzle hole with the curable liquid and bending the sidewall of the pressure chamber using a piezoelectric element, the piezoelectric drive type droplet discharge head can discharge, as droplets, a curable liquid with a volume corresponding to the reduced volume of the pressure chamber. The control unit 70 that is described later can adjust the amount of the curable liquid per droplet to be discharged from the head unit 50 by controlling the waveform of the voltage to be applied to the piezoelectric element.

The curing energy applying unit 60 is an apparatus for applying energy for curing the curable liquid discharged from the head unit 50. In this embodiment, the curing energy applying unit 60 is constituted by a main curing light emitting apparatus 61 and a provisional curing light emitting apparatus 62 that are arranged so as to sandwich the head unit 50 in the X direction. When the head unit 50 is moved, the curing energy applying unit 60 also moves with the head unit 50. Ultraviolet rays as curing energy for curing the curable liquid are emitted from the main curing light emitting apparatus 61 and the provisional curing light emitting apparatus 62. The provisional curing light emitting apparatus 62 is used for performing provisional curing to fix the discharged curable liquid at the landing position thereof. The main curing light emitting apparatus 61 is used for completely curing the curable liquid after provisional curing. The energy of the ultraviolet rays emitted from the provisional curing light emitting apparatus 62 is 20 to 30% of the energy of the ultraviolet rays emitted from the main curing light emitting apparatus 61, for example.

The control unit 70 is provided with a CPU and a memory. The CPU has a function of modeling a three-dimensional object by controlling the actuator 13, the powder supply unit 20, the flattening mechanism 30, the head unit 50 and the curing energy applying unit 60 by loading a computer program stored in the memory or a recording medium to the memory and executing the program. This function includes a function of controlling the head unit 50 so as to cause colored ink and colorless ink to be discharged into a unit grille UG (see FIG. 4), which is described later, such that the spatial volume of the unit grille UG is filled with the colored ink and colorless ink. This function also includes a function of discharging colored ink into two unit grilles UG adjacent to each other, and expressing one color using the combination of the colored ink discharged into the two unit grilles UG. Note that these functions may be realized by an electronic circuit.

Figure 2:
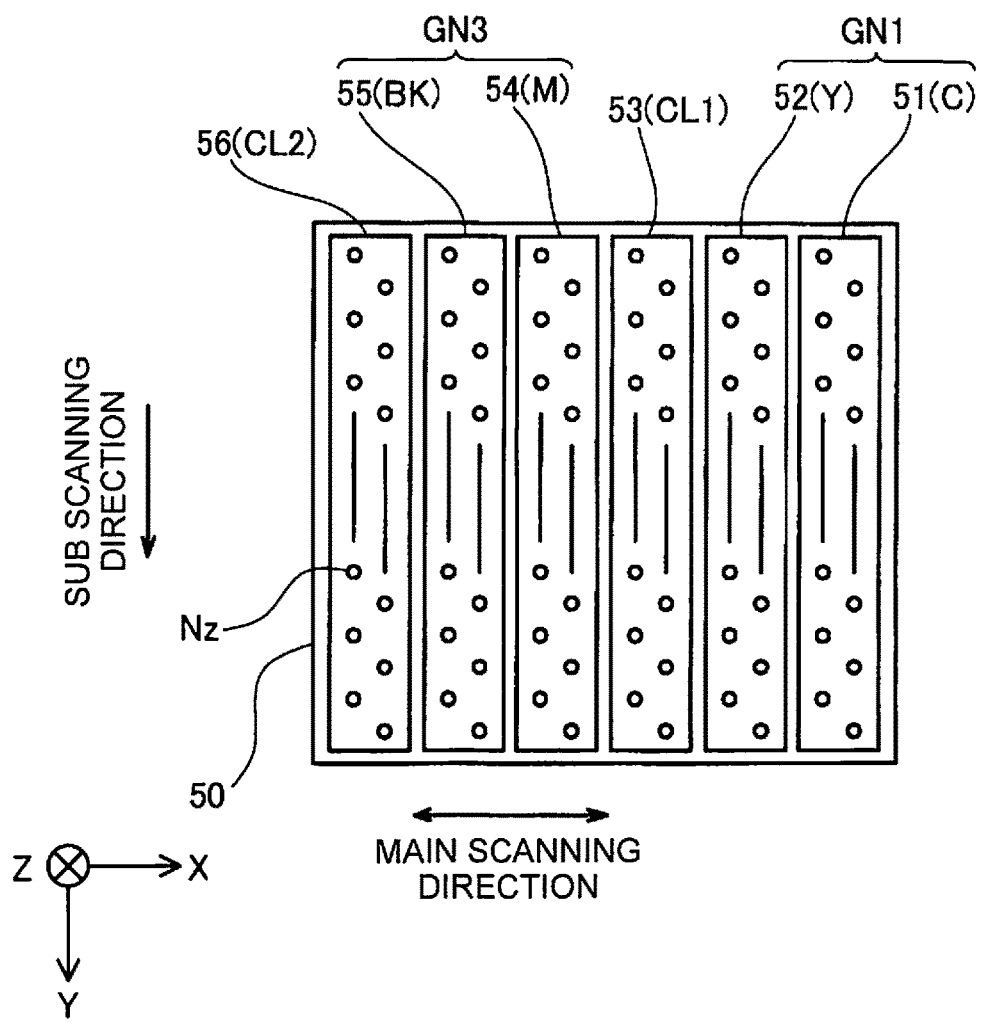
FIG. 2 is an explanatory diagram showing a schematic configuration of a head unit.

FIG. 2 is an explanatory diagram showing the schematic configuration of the head unit 50. In this embodiment, the head unit 50 can discharge transparent (CL) ink as colorless ink, as well as cyan (C) ink, yellow (Y) ink, magenta (M) ink, and black (BK) ink as colored ink. Note that colors of the ink discharged from the head unit 50 are not limited thereto. For example, the head unit 50 may be configured to be able to discharge white (W) ink. In the head unit 50, a first A nozzle group 51 for discharging droplets of cyan (C) ink, a first B nozzle group 52 for discharging droplets of yellow (Y) ink, a second nozzle group 53 for discharging droplets of transparent (CL) ink, a third A nozzle group 54 for discharging droplets of magenta (M) ink, a third B nozzle group 55 for discharging droplets of black (BK) ink, and a fourth nozzle group 56 for discharging droplets of transparent (CL) ink are aligned in this order in the main scanning direction (X direction). In order to distinguish between the transparent ink discharged from the second nozzle group 53 and the transparent ink discharged from the fourth nozzle group 56, the transparent ink discharged from the second nozzle group 53 is also referred to as "first clear ink CL1", and the transparent ink discharged from the fourth nozzle group 56 is also referred to as "second clear ink CL2", hereinafter. In the nozzle groups 51 to 56, a plurality of nozzles Nz are aligned in zigzags in a sub scanning direction (Y direction). Note that in each of the nozzle groups 51 to 56, the nozzles Nz may be linearly aligned. In addition, the types of colored ink discharged from the nozzle groups 51, 52, 54, and 55 are not limited to the above. Hereinafter, the side on which the first A nozzle group 51 is formed is also referred to as "the front side of the head unit 50", and the side on which the fourth nozzle group 56 is formed is also referred to as "the rear side of the head unit 50". In addition, the first A nozzle group 51 and the first B nozzle group 52 are also collectively referred to as "first nozzle group GN1", and the third A nozzle group 54 and the third B nozzle group 55 are also collectively referred to as "third nozzle group GN3".

A method for modeling (manufacturing) a three-dimensional object using the three-dimensional modeling apparatus 100 (FIG. 1) will be briefly described. The computer 200 first slices polygon data indicating the shape of the three-dimensional object in accordance with a modeling resolution (lamination pitch) in the Z direction, and generates a plurality of cross section data in the XY directions. This cross section data has a predetermined modeling resolution in the X direction and the Y direction, and is represented by two-dimensional bitmap data in which for each element, the type and amount of curable liquid (colored ink and colorless ink) to be discharged at a corresponding XY coordinate are stored. That is, in this embodiment, bitmap data designates, for the control unit 70 of the three-dimensional modeling apparatus 100, a coordinate for which the curable liquid is to be discharged and the type and amount of the curable liquid to be discharged.

Upon acquiring the cross section data from the computer 200, the control unit 70 of the three-dimensional modeling apparatus 100 forms a powder layer in the modeling unit 10 by controlling the powder supply unit 20 and the flattening mechanism 30. The control unit 70 then drives the head unit 50 so as to discharge the curable liquid onto the powder layer in accordance with the cross section data, subsequently controls the curing energy applying unit 60 so as to emit ultraviolet light toward the discharged curable liquid, and performs provisional curing and main curing. The curable liquid then cures due to the ultraviolet light, powder particles are coupled with one another, and a cross section body corresponding to cross section data for one layer is formed in the modeling unit 10. When the cross section body for one layer is formed in this manner, the control unit 70 drives the actuator 13 so as to lower the modeling stage 11 in the Z direction for a lamination pitch that is in accordance with a modeling resolution in the Z direction. When the modeling stage 11 has been lowered, the control unit 70 forms a new powder layer on the cross section body that has already been formed on the modeling stage 11. When the new powder layer is formed, the control unit 70 receives next cross section data from the computer 200 and forms a new cross section body by discharging the curable liquid onto the new powder layer and emitting ultraviolet light. In this manner, on receiving cross section data for each layer from the computer 200, the control unit 70 controls the actuator 13, the powder supply unit 20, the flattening mechanism 30, the head unit 50, and the curing energy applying unit 60 so as to form a cross section body for each layer, and consecutively laminates cross section bodies, thereby modeling a three-dimensional object.

Figure 3:
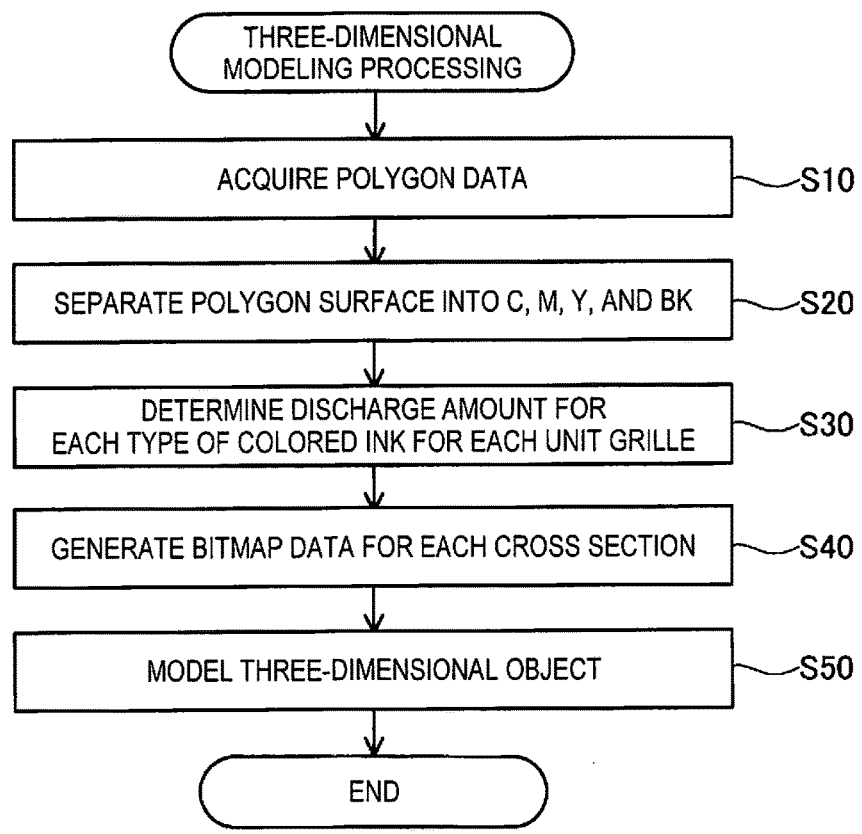
FIG. 3 is a flowchart of three-dimensional modeling processing.

FIG. 3 is a specific flowchart of three-dimensional modeling processing executed in this embodiment. In this embodiment, the computer 200 first acquires polygon data indicating the shape of a three-dimensional object from an application program or the like being executed on a recording medium, a network or the computer 200 (step S10). When the polygon data is acquired, the computer 200 separates the images on the surfaces of polygons that are represented by the polygon data into the colors C, M, Y and BK (step S20). Subsequently, the computer 200 determines a discharge amount for each type of colored ink for each of the unit grilles UG (FIG. 4) in accordance with the gradation value of each color (step S30). As will be described later, in this embodiment, gradation expression is performed using two unit grilles UG aligned in the depth direction (see FIG. 4B). Therefore, the computer 200 determines a discharge amount for each type of colored ink to be discharged into each of these two unit grilles UG in accordance with the gradation value of each color. A method for determining a discharge amount for each type of colored ink to be discharged into each of the unit grilles UG will be described later.

When the processing of step S30 is complete, the computer 200 generates, for each cross section, bitmap data that includes a discharge amount for each type of colored ink for each of the unit grilles UG determined in step S30 (step S40). In each piece of the cross section data, coordinates corresponding to the outermost periphery of a cross section body are referred to as "outermost periphery coordinates", and coordinates corresponding to the positions adjacent to the outermost periphery of the cross section body in the depth direction of the cross section body are referred to as "adjacent coordinates". In this case, out of the above-described two unit grilles UG aligned in the depth direction, the unit grille UG on the surface side corresponds to the outermost periphery coordinates in the cross section data, and out of the two unit grilles UG, the unit grille UG on the interior side corresponds to an adjacent coordinates of the cross section data. Therefore, the computer 200 stores the discharge amounts of colored ink to be discharged into the unit grille UG on the surface side at the outermost periphery coordinates, and stores the discharge amounts of colored ink to be discharged into the unit grille UG on the interior side at the adjacent coordinates. The computer 200 stores a value for discharging clear ink (at least one of CL1 and CL2) at coordinates inward of the outermost periphery coordinates and adjacent coordinates.

When the bitmap data has been generated for each cross section, the control unit 70 of the three-dimensional modeling apparatus 100 receives the bitmap data from the computer 200, controls the units such as the head unit 50 in accordance with the received bitmap data, and models the three-dimensional object (step S50). As described above, the discharge amounts of ink of the colors of C, M, Y and BK are registered at the outermost periphery coordinates and adjacent coordinates of each cross section data, and the value for discharging clear ink is stored at coordinates inward of the outermost periphery coordinates and adjacent coordinates. Therefore, in step S50, an object that is transparent inside and is colored near the surface is modeled. In step S50, the control unit 70 models the three-dimensional object in accordance with the following method.

Figure 4A:
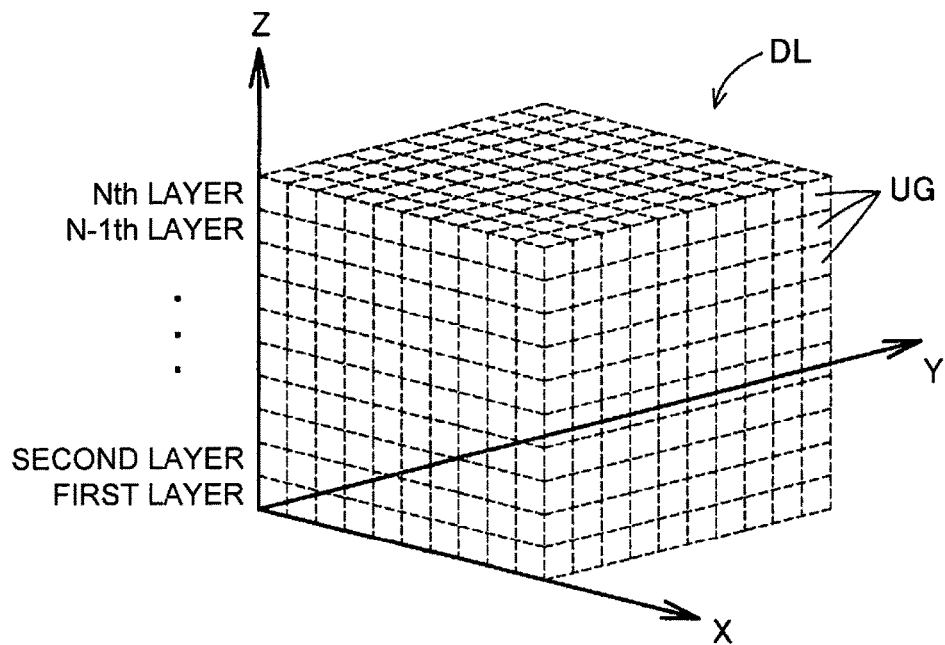
FIGS. 4A and 4B are diagrams for explaining a method for modeling a three-dimensional object.
Figure 4B:
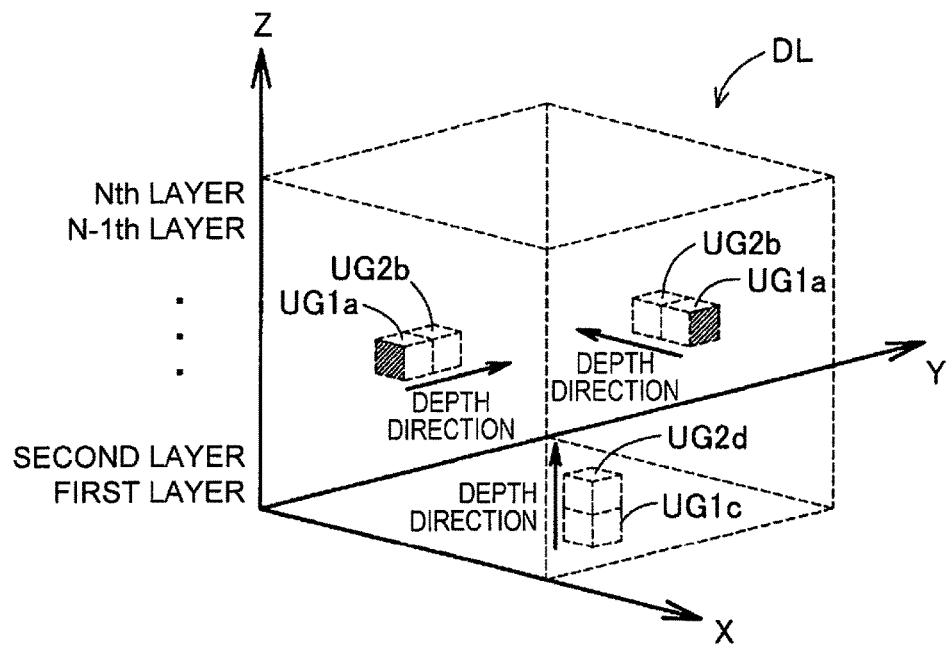

FIGS. 4A and 4B are diagrams for explaining a method for modeling a three-dimensional object. The control unit 70 that received the bitmap data controls the head unit 50 to cause a curable liquid of a designated amount and a designated type (at least one of colored ink and colorless ink) to be discharged at coordinates designated in the bitmap data. In other words, the control unit 70 controls the head unit 50 so as to causes the curable liquid to be discharged into each of the unit grilles UG constituting virtual three-dimensional grilles DL shown in FIG. 4A, thereby modeling the object. The unit grille UG herein refers to a virtual three dimensional region that has a minimum volume that is in accordance with modeling resolutions of a cross section body in the X direction and the Y direction, and the lamination interval of the cross section body in the Z direction, and as described above, one unit grille UG corresponds to one coordinate in the bitmap data. The control unit 70 completes a cross section body for a first layer by causing the curable liquid to be discharged into the unit grilles UG constituting the first layer of the three-dimensional grilles DL based on cross section data (bitmap data) of the first layer, and after that, completes a cross section body for a second layer by causing the curable liquid to be discharged into the unit grilles UG constituting the second layer based on cross section data of the second layer. By repeating this processing up to an Nth layer, the three-dimensional object as a laminated body is formed. The unit grille UG is also referred to as a voxel. Note that in the case of this embodiment for modeling an object using powder, the spatial volume of a unit grille UG is a volume obtained by deducting the volume of the powder included in the unit grille UG from the volume of the unit grille UG, and colored ink and colorless ink are discharged so as to substantially fill the spatial volume.

As described above, the discharge amounts for the colors C, M, Y, and BK are recorded at the outermost periphery coordinates and adjacent coordinates of each piece of the cross section data, and the value for discharging clear ink is stored at coordinates inward of the outermost periphery coordinates and adjacent coordinates. Therefore, as shown in FIG. 4B, the head unit 50 discharges colored ink into two unit grilles (UG1a and UG2b, or UG1c and UG2d) continuously aligned in a direction from the surface side to the interior side of the object (the depth direction). Here, a unit grille UG1a is a unit grille corresponding to a side surface of the object, and a hatched portion in FIG. 4B indicates an outer surface of the object. A unit grille UG2b is a unit grille that is positioned on the side opposite to the unit grille UG1a side constituting the outer surface of the object (hatched portion side), and that is aligned with the unit grille UG1a in the X direction or Y direction. A unit grille UG1c is a unit grille corresponding to the bottom surface of the object, and the bottom surface of the unit grille UG1c constitutes the bottom surface of the object. A unit grille UG2d is a unit grille that is positioned on the upper surface side of the unit grille UG1c, and is aligned with the unit grille UG1c in the Z direction. The unit grille UG1a and the unit grille UG1c correspond to the outermost periphery coordinates of the bitmap data. In addition, the unit grille UG2b and the unit grille UG2d correspond to the adjacent coordinates of the bitmap data. The unit grille UG1a and the unit grille UG1c of this embodiment correspond to "first unit grilles" in the claims, and the unit grille UG2b and the unit grille UG2d correspond to "second unit grilles" in the claims.

As described above, the colored ink is discharged into the first and second unit grilles UG1a and UG2d, and only colorless ink is discharged into the other unit grilles UG, and therefore an object is modeled in which an inner portion surrounded by the first and second unit grilles UG1a and UG2d is transparent, and a surface portion corresponding to the first and second unit grilles UG1a and UG2d is colored. The control unit 70 discharges colored ink into the unit grilles UG1a and the unit grilles UG2b in accordance with a method shown in FIG. 5 and FIGS. 6A to 6D, which will be described later. The control unit 70 also discharges colored ink into the unit grilles UG1c and the unit grilles UG2d in accordance with a method shown in FIGS. 7A to 7D and FIG. 8, which will be described later.

Figure 5:
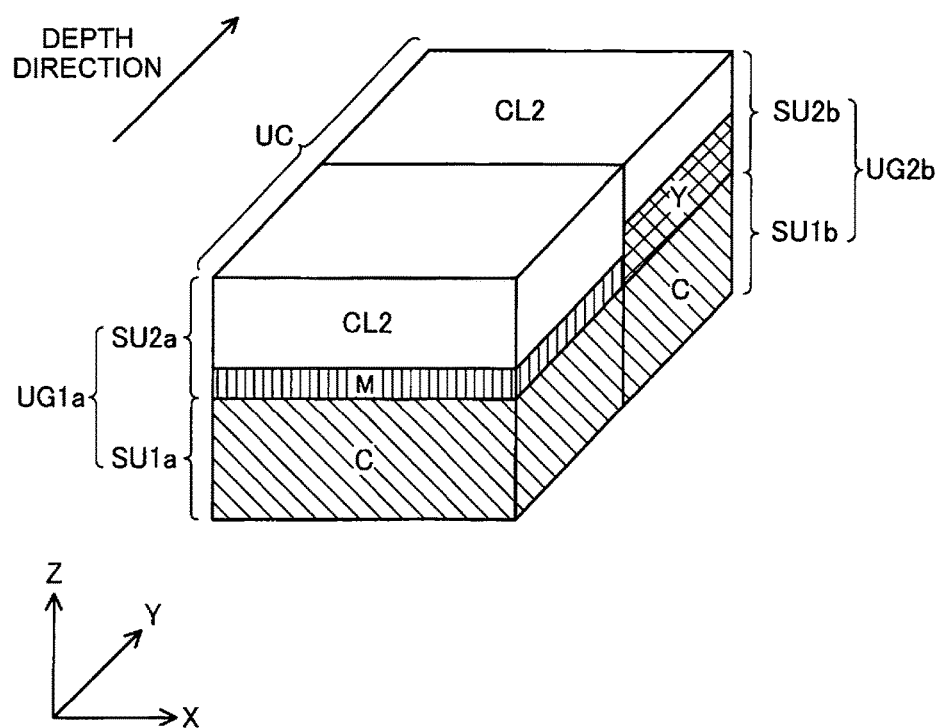
FIG. 5 is a diagram for explaining a method for expressing a color of a side surface of an object.

FIG. 5 is a diagram for explaining a method for expressing a color of a side surface of an object. In FIG. 5, a unit grille column UC that includes the unit grille UG1a and the unit grille UG2b after colored ink and colorless ink were discharged is illustrated. Each of the unit grille UG1a and the unit grille UG2b includes a plurality of sub unit grilles SU aligned in the Z direction. The sub unit grille SU is also referred to as a sub voxel. The unit grille UG1a includes a sub unit grille SU1a and a sub unit grille SU2a, and the unit grille UG2b includes a sub unit grille SU1b and a sub unit grille SU2b. The sub unit grille SU1a and the sub unit grille SU1b of this embodiment correspond to "first sub unit grilles" in the claims, and the sub unit grille SU2a and the sub unit grille SU2b correspond to "second sub unit grilles" in the claims.

The head unit 50 can discharge ink of one of C, M, Y, BK, and CL in an amount designated by the control unit 70 into each of the sub unit grilles SU. The color of a side surface of the object viewed from the side surface side of the unit grille UG1a (Y direction side) is expressed by the combination of the colored ink discharged into the sub unit grilles SU1a to SU2b. The control unit 70 causes one type of colored ink C, M, Y, and BK to be discharged at a time into each of the sub unit grilles SU, and in the case where the spatial volume of the sub unit grille SU is not filled with the colored ink, clear ink CL, which is colorless ink, is caused to be discharged into the sub unit grille SU in addition to the colored ink, such that the spatial volume of the sub unit grille SU is filled with both the colored ink and the colorless ink. Therefore, regardless of type and amount of colored ink discharged into sub unit grilles SU, all of the total volumes of the ink discharged into the unit grilles UG are the same.

The control unit 70 can perform following control. The control unit 70 causes colored ink (C or Y) to be discharged from the first nozzle group GN1 (FIG. 2) into the sub unit grille SU1a, and in the case where the sub unit grille SU1a is not filled with the colored ink, causes the first clear ink CL1 to be discharged from the second nozzle group 53 so as to fill the sub unit grille SU1a. Subsequently, colored ink (M or BK) is discharged from the third nozzle group GN3 into the sub unit grille SU2a, and in the case where the sub unit grille SU2a is not filled with the colored ink, the second clear ink CL2 is discharged from the fourth nozzle group 56 so as to fill the sub unit grille SU2a. Thereby, the spatial volume of the unit grille UG1a is filled with ink. Next, the control unit 70 causes colored ink (C or Y) that can be discharged from the first nozzle group GN1 to be discharged into the sub unit grille SU1b, similarly to the sub unit grille SU1a, and in the case where the sub unit grille SU1b is not filled with the colored ink, causes the first clear ink CL1 to be discharged from the second nozzle group 53, so as to fill the sub unit grille SU1b. Subsequently, colored ink (M or BK) that can be discharged from the third nozzle group GN3 is discharged into the sub unit grille SU2b, similarly to the sub unit grille SU2a, and in the case where the sub unit grille SU2b is not filled with the colored ink, the second clear ink CL2 is discharged from the fourth nozzle group 56 so as to fill the sub unit grille SU2b.

FIGS. 6A to 6D are diagrams showing an example of the unit grille UG1a and the unit grille UG2b after ink was discharged. The head unit 50 of this embodiment selects a discharge amount of colored ink per droplet from among four types, that is, "none (no discharge)", "small", "intermediate", and "large" in accordance with the discharge amount in the bitmap data. In the above-described step S30 (FIG. 3), the computer 200 may determine a discharge amount of each type of colored ink to be discharged into the unit grille UG1a and the unit grille UG2b as follows. For example, if the gradation value of the surface image of a polygon is greater than or equal to 0% and less than 50%, the computer 200 selects a discharge amount of colored ink to be discharged into the unit grille UG1a from among "none", "small", "intermediate", and "large" in accordance with the magnitude of the gradation value. If the gradation value is greater than or equal to 50% and less than 100%, the discharge amount of colored ink to be discharged into the unit grille UG1a is "large", and the discharge amount of colored ink to be discharged into the unit grille UG2b is selected from among "none", "small", "intermediate", and "large" in accordance with the magnitude of the gradation value. In other words, in this embodiment, it becomes possible to determine a discharge amount of each type of ink for the two unit grilles UG1a and UG2b from a lookup table in which the gradation values of C, M, Y, and BK are associated with the discharge rates of discharge amounts "small", "intermediate" and "large" of these ink colors, and a dither matrix of each of the ink colors. In this embodiment, the head unit 50 discharges 2 pl of colored ink in the case where the discharge amount is "small", 4 pl of colored ink in the case of "intermediate", and 8 pl of colored ink in the case of "large". The amount of ink discharged in the case where the discharge amount of colored ink is "large" matches the capacity of one sub unit grille SU. In this embodiment, the discharge amount of ink of each color has four levels, but may have more detailed levels or broader levels in accordance with the ability of the head unit 50 to adjust the discharge amount.

When a discharge amount of colored ink is selected based on the bitmap data as described above, the control unit 70 determines an amount of clear ink to be discharged into the sub unit grille SU into which the colored ink is to be discharged, in accordance with the selected discharge amount of the colored ink. Specifically, the control unit 70 determines the discharge amount of clear ink such that the total of the discharge amount of the colored ink and the discharge amount of the clear ink equals the "large" amount of the colored ink. Specifically, the head unit 50 selects a discharge amount of colorless ink per droplet from among four types, that is, "none (no discharge)", "small", "intermediate", and "large". The control unit 70 causes the head unit 50 to discharge 4 pl of colorless ink in the case where the discharge amount is "small", 6 pl of colorless ink in the case of "intermediate", and 8 pl of colorless ink in the case of "large". In other words, the discharge amount of clear ink is "large" in the case where the discharge amount of colored ink is "none", the discharge amount of clear ink is "intermediate" in the case where the discharge amount of colored ink is "small", the discharge amount of clear ink is "small" in the case where the discharge amount of colored ink is "intermediate", and the discharge amount of clear ink is "none" in the case where the discharge amount of colored ink is "large". Note that the configurations (types and amounts) of ink in the sub unit grilles SU shown FIG. 5 and FIGS. 6A to 6D are as follows.

Configurations in FIG. 5
Sub unit grille SU1a: cyan (C), "large"+first clear CL1, "none"
Sub unit grille SU2a: magenta (M), "small"+second clear CL2 "intermediate"
Sub unit grille SU1b: cyan (C), "large"+first clear CL1, "none"
Sub unit grille SU2b: yellow (Y), "intermediate"+second clear CL2 "small"
Configurations in FIG. 6A
Sub unit grille SU1a: cyan (C), "large"+first clear CL1, "none"
Sub unit grille SU2a: magenta (M), "large"+second clear CL2 "none"
Sub unit grille SU1b: cyan (C), "large"+first clear CL1, "none"
Sub unit grille SU2b: magenta (M), "large"+second clear CL2 "none"
Configurations in FIG. 6B
Sub unit grille SU1a: yellow (Y), "large"+first clear CL1, "none"

Sub unit grille SU2a: black (BK), "large"+second clear CL2 "none"
Sub unit grille SU1b: yellow (Y), "intermediate"+first clear CL1, "small"
Sub unit grille SU2b: black (BK), "intermediate"+second clear CL2 "small"
Configuration in FIG. 6C
Sub unit grille SU1a: cyan (C), "large"+first clear CL1, "none"
Sub unit grille SU2a: magenta (M), "large"+second clear CL2 "none"
Sub unit grille SU1b: yellow (Y), "large"+first clear CL1, "none"
Sub unit grille SU2b: black (BK), "large"+second clear CL2 "none"
Configuration in FIG. 6D
Sub unit grille SU1a: cyan (C), "small"+first clear CL1, "intermediate"
Sub unit grille SU2a: magenta (M), "small"+second clear CL2 "intermediate"
Sub unit grille SU1b: yellow (Y), "intermediate"+first clear CL1, "small"
Sub unit grille SU2b: black (BK), "intermediate"+second clear CL2 "small"

FIGS. 7A to 7D are diagrams for explaining a method for expressing a color of the bottom surface of an object. In FIGS. 7A to 7D, the unit grille UG1c and the unit grille UG2d after colored ink and colorless ink were discharged are illustrated. The configurations of ink in the sub unit grilles SU shown in FIGS. 7A to 7D respectively correspond to the configurations of ink shown in FIGS. 6A to 6D. The unit grille UG1c includes a sub unit grille SU1c and a sub unit grille SU2c, and the unit grille UG2d includes a sub unit grille SU1d and a sub unit grille SU2d. The sub unit grille SU1c and the sub unit grille SU1d correspond to "first sub unit grilles" in the claims, and the sub unit grille SU2c and the sub unit grille SU2d correspond to "second sub unit grilles" in the claims.

The control unit 70 causes one type of colored ink to be discharged at a time into each of the sub unit grilles SU1c to SU2d, similarly to the above sub unit grilles SU1a to SU2b (FIGS. 6A to 6D), and in the case where the spatial volume of the sub unit grille SU is not filled with the colored ink, causes clear ink CL, which is colorless ink, to be discharged into the sub unit grille SU in addition to the colored ink, such that the spatial volume of the sub unit grille SU is filled with both the colored ink and the colorless ink. The control unit 70 also obtains, from the bitmap data, the discharge amounts of the colored ink to be discharged into the sub unit grilles SU1c to SU2d, and determines a discharge amount of colorless ink by a method the same as the above method regarding the sub unit grilles SU1a to SU2b (FIGS. 6A to 6D). Accordingly, the color of the bottom surface of the object viewed from below the sub unit grille SU1c is expressed by the combination of the colored ink discharged into the sub unit grilles SU1c to SU2d.

Figure 8:
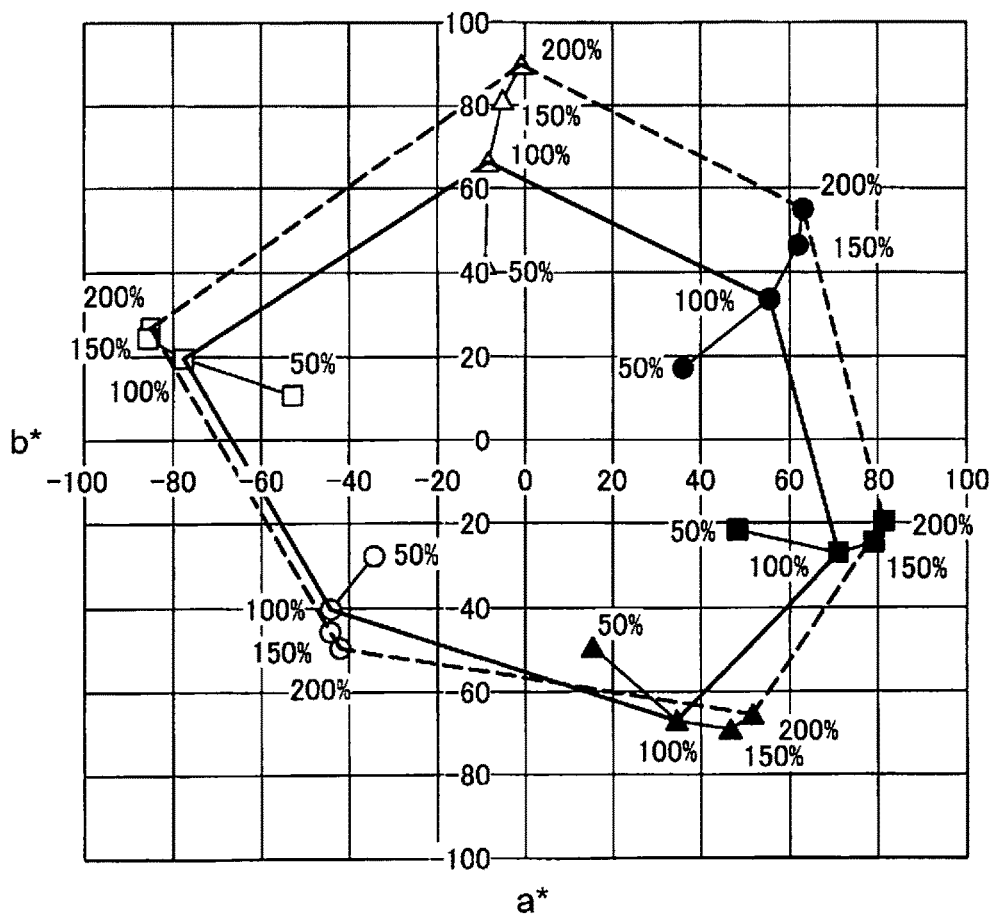
FIG. 8 is a diagram for explaining an example of an effect of the first embodiment.

FIG. 8 is a diagram for explaining an example of an effect of the first embodiment. In FIG. 8, the color gamut (a*b*plane) that can be expressed by the three-dimensional modeling apparatus 100 of this embodiment is shown. According to the three-dimensional modeling apparatus 100 of this embodiment, an object is also colored in the depth direction thereof (FIG. 4), and therefore color density viewed from the outer surface of the object can be expressed more finely. Here, the spatial volume of one sub unit grille SU is denoted by Vs, the total amount (discharged amount) of ink of the same color that was discharged into one or more sub unit grilles SU regarding each type of colored ink is denoted by Mi, and the discharge amount Mi of colored ink for the spatial volume Vs of the sub unit grille SU is denoted by duty [%] (MiNs). For example, in a portion that constitutes a (X, Y) plane in FIG. 7A, cyan (C) represents a duty of 200% (twice the spatial volume of a sub unit grille SU) based on the sub unit grille SU1c and the sub unit grille SU1d of the two unit grilles UG1c and UG2d that are continuously aligned in a direction from the surface side to the interior side (the depth direction), and magenta (M) represents a duty of 200% (twice the spatial volume of a sub unit grille SU) based on the sub unit grille SU2c and the sub unit grille SU2d. In this embodiment, because colored ink can be discharged into two sub unit grilles SU included in each of the two unit grilles UG, the outer face of the object can be expressed at a maximum duty of 400% in total for each of the colors. In addition, ink of the same color can be discharged into two sub unit grilles SU, and therefore a maximum duty for each color is 200%. However, for example, in the case of a configuration of a comparison example in which ink of the same color can be discharged into only one sub unit grille SU, the maximum duty of each color is 100%. In FIG. 8, this embodiment in which the maximum duty of each color is 200% is indicated by broken lines, and the comparison example in which the maximum duty of each color is 100% is indicated by solid lines. It can be seen from FIG. 8 that the color gamut that can be expressed in this embodiment is broader than the comparison example. In this manner, according to this embodiment, it is possible to increase the number of colors that can be expressed on the surface of the object per unit area, and improve color reproducibility.

In addition, according to the three-dimensional modeling apparatus 100 of this embodiment, it is possible to adjust the amount of colored liquid to be discharged into the sub unit grille SU, which is a unit finer than the unit grille that is in accordance with the modeling resolution, and therefore, when modeling a colored three-dimensional object, it is possible to suppress deterioration of the apparent resolution of the three-dimensional object compared with a case in which the coloring is performed using only one color for one unit grille UG. In addition, in this embodiment, in the case where the spatial volume of a sub unit grille is not filled with the amount of colored liquid discharged into the sub unit grille, the remaining spatial volume of the sub unit grille is filled with colorless liquid. Therefore, the volumes of the sub unit grilles are uniformized, and the volumes of the unit grilles are also uniformized. Therefore, the three-dimensional object can be accurately modeled.

According to the three-dimensional modeling apparatus 100 of this embodiment, in the main scanning direction, the second nozzle group 53 for discharging colorless liquid is arranged rearward of the first nozzle group GN1 (FIG. 2) for discharging colored liquid into the sub unit grille SU1a (FIG. 5), the third nozzle group GN3 is arranged rearward of the second nozzle group 53, and the fourth nozzle group 56 for discharging colorless liquid is arranged rearward of the third nozzle group GN3 for discharging colored liquid into the sub unit grille SU2a. Therefore, after the sub unit grille SU1a is filled with liquid discharged from the first nozzle group GN1 and the second nozzle group 53, the sub unit grille SU2a can be filled with liquid discharged from the third nozzle group GN3 and the fourth nozzle group 56. Accordingly, the spatial volumes of the sub unit grilles SU1 and SU2 constituting the unit grille UG can be filled with colorless liquid while adjusting the amount of colored liquid to be discharged into each of the two sub unit grilles SU1 and SU2. Thereby, the volumes of the sub unit grilles can be more easily uniformized. In addition, according to the above-described alignment of the nozzle groups, colored liquid that was discharged into the sub unit grille SU1c (FIG. 7D) is positioned on the lower side of the sub unit grille SU1c, and colorless liquid (CL1) that was discharged after that is positioned on the upper side of the sub unit grille SU1c. Accordingly, in the case where the lower side of the sub unit grille SU1c constitutes the surface side of the object, the colored liquid is arranged on the surface side of the object, and therefore color reproducibility of the object can be improved.

B. Second Embodiment

Figure 9:
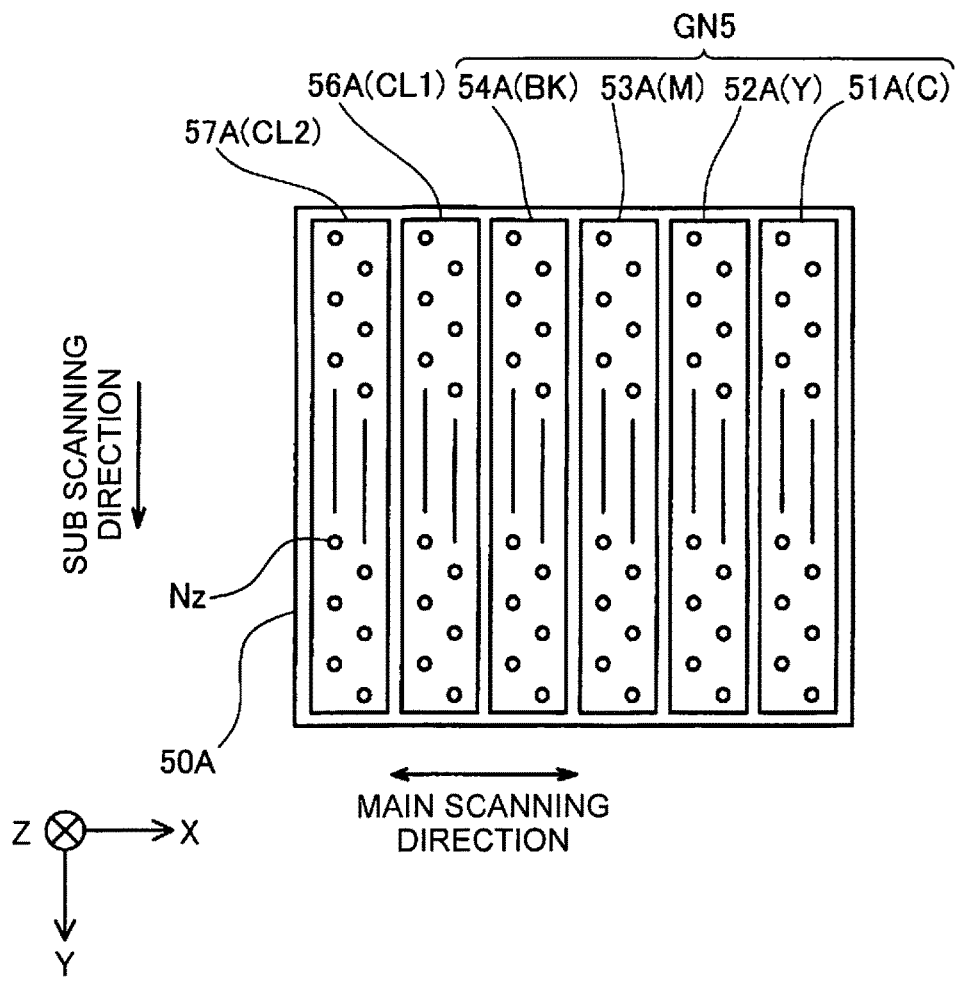
FIG. 9 is an explanatory diagram showing a schematic configuration of a head unit of a second embodiment.

FIG. 9 is an explanatory diagram showing the schematic configuration of a head unit 50A of a second embodiment. The head unit 50A of the second embodiment has a configuration the same as that of the head unit 50 of the first embodiment, except that the arrangement of the nozzle groups is different. In the head unit 50A, a fifth A nozzle group 51A for discharging droplets of cyan (C) ink, a fifth B nozzle group 52A for discharging droplets of yellow (Y) ink, a fifth C nozzle group 53A for discharging droplets of magenta (M) ink, a fifth D nozzle group 54A for discharging droplets of black (BK) ink, a sixth nozzle group 56A for discharging droplets of the first clear (CL1) ink, and a seventh nozzle group 57A for discharging droplets of the second clear (CL2) ink are aligned in this order in the main scanning direction (X direction). The nozzle groups 51A to 54A are also referred to as "fifth nozzle group GN5" collectively.

FIGS. 10A to 10F are diagrams showing an example of unit grilles UG in the second embodiment. In FIGS. 10A to 10C, a unit grille UG1e and a unit grille UG2f after colored ink and colorless ink were discharged are illustrated, and in FIGS. 10D to 10F, a unit grille UG1g and a unit grille UG2h are illustrated. The unit grilles UG1e to UG2h of the second embodiment do not have sub unit grilles SU. The control unit 70 causes one or more types of colored ink C, M, Y, and BK to be discharged into each of the unit grilles UG1e to UG2h, and in the case where the spatial volume of each of the unit grilles UG is not filled with the one or more types of colored ink, causes the clear ink CL, which is colorless ink, to be discharged into the unit grille in addition to the one or more types of colored ink, such that the spatial volume of the unit grille UG is filled with both the colored ink and colorless ink.

Similarly to the first embodiment, the head unit 50 discharges 2 pl of colored ink in the case where the discharge amount of the colored ink is "small", 4 pl of colored ink in the case of "intermediate", and 8 pl of colored ink in the case of "large". The control unit 70 determines the discharge amount of clear ink, such that the total of the discharge amount of the colored ink and the discharge amount of the clear ink equals the spatial volume of each of the unit grilles UG. Here, explanation will be given assuming that the spatial volume of each of the unit grilles UG is filled with 16 pl of ink. Similarly to the first embodiment, the head unit 50 discharges 4 pl of colorless ink in the case where the discharge amount of the colorless ink is "small", 6 pl of colorless ink in the case of "intermediate", and 8 pl of colorless ink in the case of "large". The configurations of ink in the unit grilles UG shown in FIGS. 10A to 10C are as follows. The configurations of ink in the unit grilles UG shown in FIGS. 10D to 10F are similar to those in FIGS. 10A to 10C.

Configurations in FIG. 10A
Unit grille UG1e: M "large"+BK "large"
Unit grille UG2f: M "large"+BK "intermediate"+CL1 "small"
Configurations in FIG. 10B
Unit grille UG1e: Y "large"+M "large"
Unit grille UG2f: Y "small"+M "small"+CL1 "small"+CL2 "large"
Configurations in FIG. 10C
Unit grille UG1e: C "large"+Y "small"+M "small"+CL2 "small"
Unit grille UG2f: C "intermediate"+CL1 "small"+CL2 "large"

In accordance with the second embodiment described above, the unit grille UG is not required to have sub unit grilles SU. In addition, the number of types of colored liquid that is discharged into one unit grille UG is not limited to two types as shown in FIG. 10C. Moreover, according to this embodiment, for example, even in the case where the total amount of colored liquid that was discharged from the fifth nozzle group GN5 (FIG. 9) is small, and the amount of colorless liquid necessary to fill the unit grille UG with ink is larger the amount that can be discharged from either the sixth nozzle group 56A or the seventh nozzle group 57A, colorless liquid is sequentially discharged from both the sixth nozzle group 56A and the seventh nozzle group 57A, thereby making it possible to fill the unit grille UG with liquid. Accordingly, the volumes of the unit grilles UG can be more easily uniformized. Moreover, in accordance with this embodiment, as shown in FIGS. 10D to 10F, colored liquid discharged into the unit grille UG1g is positioned on the lower side of the unit grille UG1g, and colorless liquid is positioned above the colored liquid. Therefore, the color reproducibility when viewing the object from the lower side of the unit grille UG1g can be improved.

C. Third Embodiment

FIGS. 11A to 11F are diagrams showing an example of unit grilles in a third embodiment. In FIGS. 11A to 11C, a unit grille UG1i and a unit grille UG2j after colored ink and colorless ink were discharged are illustrated, and in FIGS. 11D to 11F, a unit grille UG1k and a unit grille UG2m are illustrated. The unit grilles UG1i to UG2m of the third embodiment are configured such that clear ink is necessarily discharged into the top portion. Note that the unit grilles UG1i to UG2m of the third embodiment do not have sub unit grilles SU. The control unit 70 causes one or more types of colored ink C, M, Y, and BK to be discharged into each of the unit grilles UG1i to UG2m, and then causes the clear ink CL, which is colorless ink, to be discharged into the unit grille UG, thereby filling the spatial volume of the unit grille UG with both the colored ink and the colorless ink, and forming a clear ink layer at the top portion of the unit grille UG.

A head unit of the third embodiment has the same configuration as that of the head unit 50 of the first embodiment (FIG. 2), except that the amounts of the first clear ink CL1 to be discharged are different. The discharge amounts of colored ink and the second clear ink CL2 are the same as in the first embodiment. That is, the head unit of the third embodiment discharges 2 pl of colored ink in the case where the discharge amount of the colored ink is "small", 4 pl of colored ink in the case of "intermediate", and 8 pl of colored ink in the case of "large". This head unit discharges 2 pl of colorless ink in the case where the discharge amount of the first clear ink CL1 is "small", 8 pl of colorless ink in the case of "intermediate", and 10 pl of colorless ink in the case of "large". The head unit discharges 2 pl of colorless ink in the case where the discharge amount of the second clear ink CL2 is "small", 4 pl of colorless ink in the case of "intermediate", and 8 pl of colorless ink in the case of "large". The control unit of the third embodiment determines the discharge amount of clear ink such that the total of the discharge amount of colored ink and the discharge amount of the clear ink equals the spatial volume of each of the unit grilles UG. Here, description will be given assuming that the spatial volume of each of the unit grilles UG is filled with 18 pl. The configurations of ink in the unit grilles UG shown in FIG. 11A to 11C are as follows. The configurations of ink in the unit grilles UG shown in FIG. 11D to 11F are the same as the configurations of ink in FIG. 11A to 11C.

The Configurations in FIG. 11A
Unit grille UG1i: C "large"+M "large"+CL2 "small"
Unit grille UG2j: C "large"+M "large"+CL2 "small"
The Configurations in FIG. 11B
Unit grille UG1i: Y "large"+BK "large"+CL2 "small"
Unit grille UG2j: Y "intermediate"+CL1 "intermediate"+BK "intermediate"+CL2 "small"
The Configurations in FIG. 11C
Unit grille UG1i: C "large"+CL1 "small"+M "intermediate"+CL2 "intermediate"
Unit grille UG2j: Y "small"+CL1 "large"+BK "small"+CL2 "intermediate"

According to the third embodiment described above, a layer made of colorless liquid is formed at the top portion of a unit grille UG, and therefore it is possible to uniformize the way that colored liquid discharged into the unit grille UG spreads in the unit grille UG. In other words, the colored liquid discharged into the unit grille UG spreads differently after landing in the case of landing on colored liquid and in the case of landing on colorless liquid. Therefore, if the top portion of the unit grille UG is constituted by colorless liquid, it is possible to cause the colored liquid that is discharged into another unit grille UG above this unit grille UG to land on the colorless liquid. For example, as shown in FIG. 11D to 11F, it is possible to cause the colored liquid discharged into the unit grille UG2m to land on the second clear ink CL2 formed at the top portion of the unit grille UG1k. Thereby, it is possible to uniformize the way that the colored liquid spreads after landing.

D. Fourth Embodiment

Figures 12A, 12B:
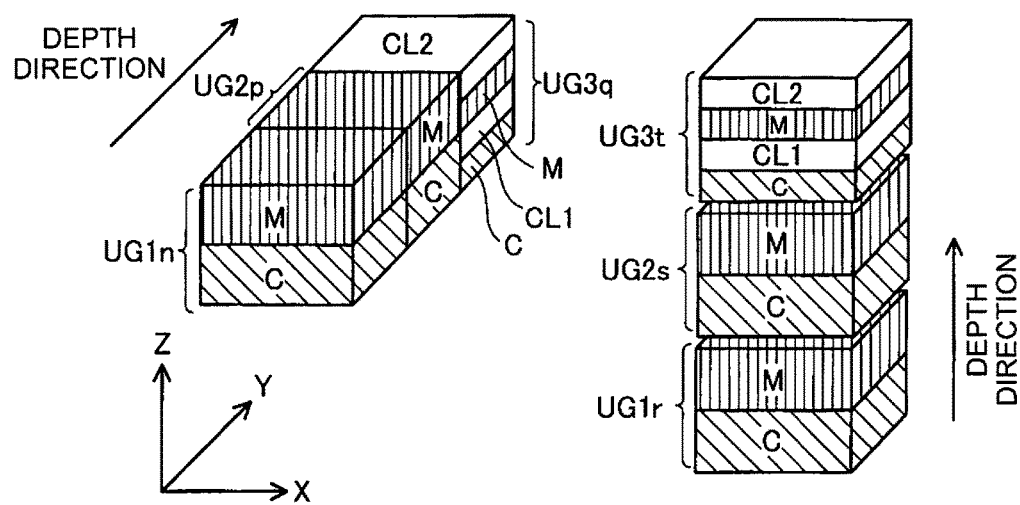
FIGS. 12A and 12B are diagrams showing examples of unit grilles in a fourth embodiment.

FIGS. 12A and 12B are diagrams showing an example of unit grilles UG in a fourth embodiment. In FIG. 12A, a unit grille UG1n, a unit grille UG2p and a unit grille UG3q after colored ink and colorless ink were discharged are illustrated, and in FIG. 12B, a unit grille UG1r, a unit grille UG2s and a unit grille UG3t are illustrated. The number of unit grilles UG included in the unit grille column UC (FIG. 5) is not limited to two. In the fourth embodiment, one color of the outer face of an object is expressed using colored ink discharged into three unit grilles UG. In other words, the color of the side surface of the object viewed from the side surface side (Y direction side) of the unit grille UG1n is expressed by the combination of colored ink discharged into the unit grilles UG1n to UG3q.

In step S30 of the fourth embodiment (FIG. 3), the computer 200 may determine the discharge amount for each type of colored ink for the unit grille UG1n, the unit grille UG2p and the unit grille UG3q as follows. For example, in the case where the gradation value is greater than or equal to 0% and less than 34%, the computer 200 selects a discharge amount of colored ink to be discharged into the unit grille UG1n from among "none", "small", "intermediate", and "large" in accordance with the magnitude of the gradation value. In addition, if the gradation value is greater than or equal to 34% and less than 67%, the discharge amount of colored ink to be discharged into the unit grille UG1n is "large", and the discharge amount of colored ink to be discharged into the unit grille UG2p is selected from among "none", "small", "intermediate", and "large" in accordance with the magnitude of the gradation value. Furthermore, if the gradation value is greater than or equal to 67% and is less than or equal to 100%, the discharge amounts of colored ink to be discharged into the unit grille UG1n and the unit grille UG2p are both "large", and the discharge amount of colored ink to be discharged into the unit grille UG3q is selected from among "none", "small", "intermediate", and "large" in accordance with the magnitude of the gradation value. In other words, in this embodiment, it becomes possible to determine a discharge amount of ink of each type for three unit grilles UG from a lookup table in which the gradations of C, M, Y, and BK are associated with the discharge amounts of these ink colors, and a dither matrix of each of the ink colors.

A head unit of the fourth embodiment has the same configuration as that of the head unit 50 of the first embodiment (FIG. 2). The control unit of the fourth embodiment determines a discharge amount of clear ink such that the total of the discharge amount of colored ink and the discharge amount of the clear ink equals the spatial volume of each of the unit grilles UG. Here, the spatial volume of each of the unit grilles UG is illustrated assuming that it is filled with 16 pl. The configurations of ink in the unit grilles UG shown in FIG. 12A are as follows. The configurations of ink in the unit grilles UG shown in FIG. 12B are similar to the configurations of ink in FIG. 12A.

Configuration in FIG. 12A
Unit grille UG1n: C "large"+M "large"
Unit grille UG2p: C "large"+M "large"
Unit grille UG3q: C "intermediate"+CL1 "small"+M "intermediate"+CL2 "small"

With this configuration as well, an object is also colored in the depth direction thereof, and thus the color density observed from the outer face of the object can be expressed more finely. Therefore, the number of colors that can be expressed per unit area on the surface of the object can be increased, and color reproducibility can also be improved. In this embodiment, colored ink can be discharged into the two sub unit grilles SU that are included in each of the three unit grilles UG, and thus the outer surface of the object can be expressed at a maximum duty of 600% in total for each of the colors. In addition, ink of the same color can be discharged into three sub unit grilles SU, and therefore each color can be expressed at a maximum duty of 300%.

E. Fifth Embodiment

Figure 13:
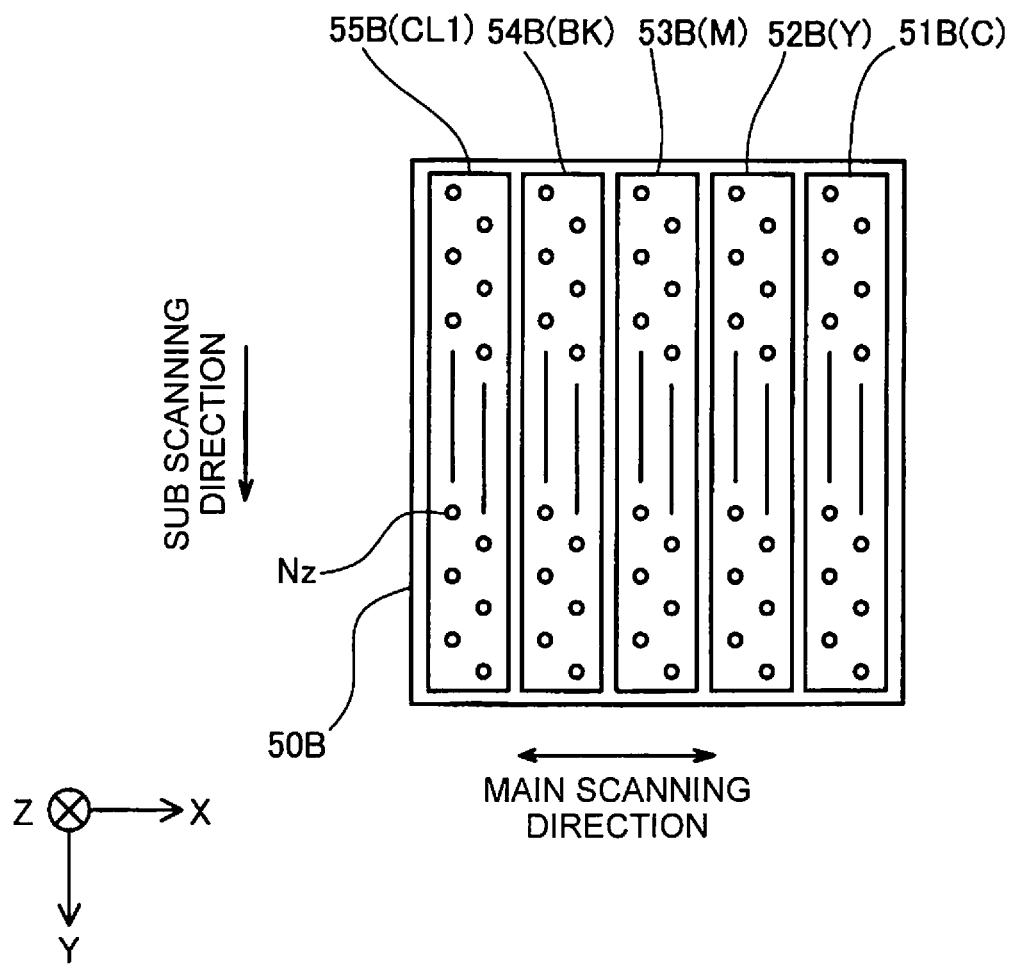
FIG. 13 is an explanatory diagram showing a schematic configuration of a head unit of a fifth embodiment.

FIG. 13 is an explanatory diagram showing the schematic configuration of a head unit 50B of a fifth embodiment. The head unit 50B of the fifth embodiment is different from the head unit 50 of the first embodiment in the number and arrangement of nozzle groups. In the head unit 50B, an eighth A nozzle group 51B for discharging droplets of cyan (C) ink, an eighth B nozzle group 52B for discharging droplets of yellow (Y) ink, an eighth C nozzle group 53B for discharging droplets of magenta (M) ink, an eighth D nozzle group 54B for discharging droplets of black (BK) ink, and an eighth E nozzle group 55B for discharging droplets of the first clear (CL1) ink are aligned in this order in the main scanning direction (X direction). With this configuration as well, in the case where the spatial volume of a sub unit grille SU is not filled with the amount of colored liquid discharged into the sub unit grille SU, the remaining spatial volume of the sub unit grille SU is filled with colorless liquid. Therefore, the volumes of the sub unit grilles SU are uniformized, and the volumes of the unit grilles UG are also uniformized. Therefore, the three-dimensional object can be accurately modeled.

F. Sixth Embodiment

Figure 14:
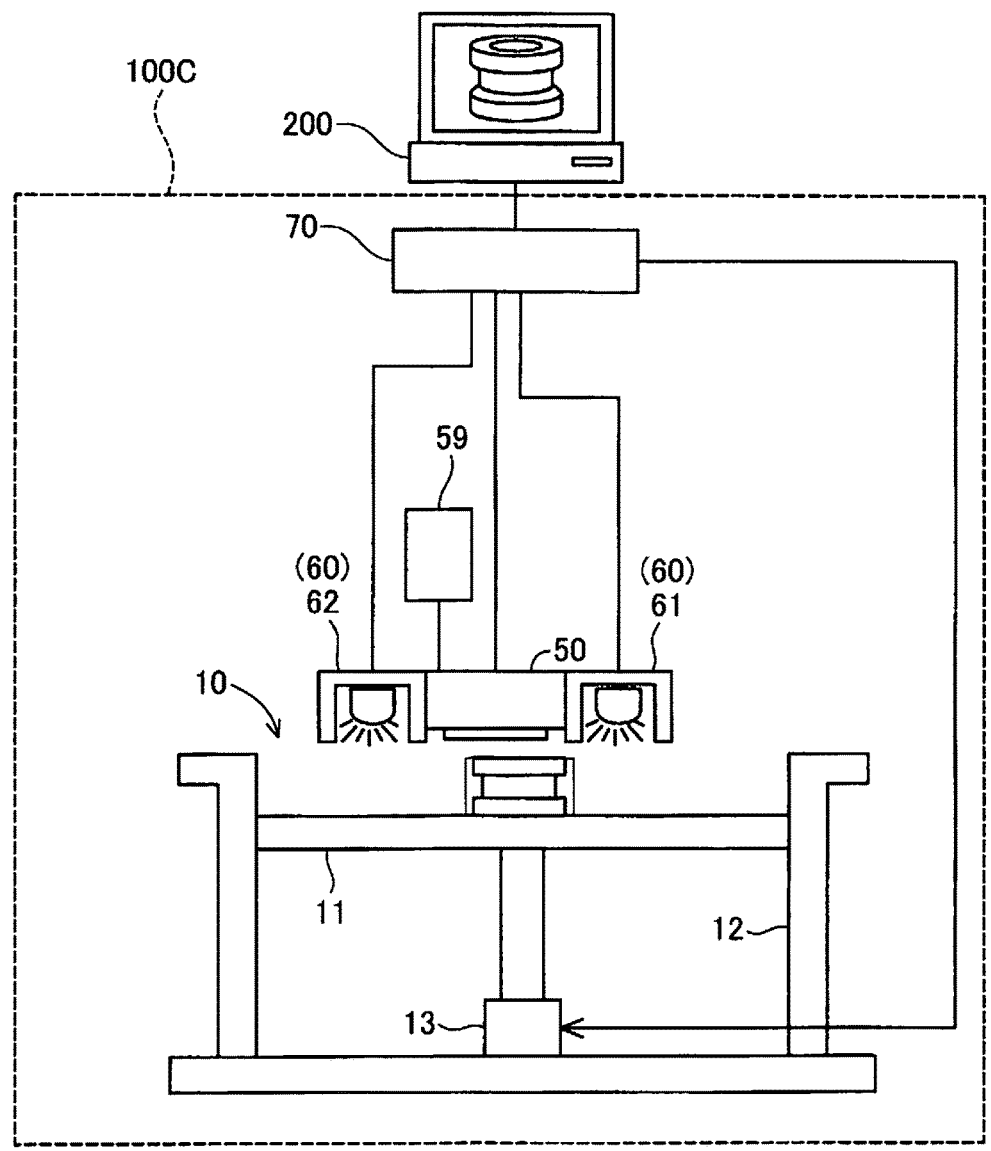
FIG. 14 is an explanatory diagram showing a schematic configuration of a three-dimensional modeling apparatus in a sixth embodiment.

FIG. 14 is an explanatory diagram showing the schematic configuration of a three-dimensional modeling apparatus in a sixth embodiment. The three-dimensional modeling apparatus 100 of the first embodiment models a three-dimensional object by discharging a curable liquid onto powder supplied into the modeling unit 10. On the other hand, a three-dimensional modeling apparatus 100C of the sixth embodiment models a three-dimensional object using only a curable liquid containing resin, without using powder.

The three-dimensional modeling apparatus 100C is provided with the modeling unit 10, the head unit 50, the curing energy applying unit 60 and the control unit 70. The modeling unit 10 is provided with the modeling stage 11, the frame body 12 and the actuator 13 similarly to the first embodiment. However, the frame body 12 may be omitted. The tank 59 is connected to the head unit 50. The curing energy applying unit 60 is provided with the main curing light emitting apparatus 61 and the provisional curing light emitting apparatus 62. That is, the three-dimensional modeling apparatus 100C has many portions in common with the configuration of the three-dimensional modeling apparatus 100 of the first embodiment, and has a configuration in which the powder supply unit 20, the flattening mechanism 30 and the powder collecting unit 40 are omitted from the three-dimensional modeling apparatus 100 of the first embodiment. Such a three-dimensional modeling apparatus 100C can also model a three-dimensional object by the same processing as that of the three-dimensional modeling apparatus 100 of the first embodiment, except for the processing for forming a powder layer. Note that in the case of this embodiment, the volume of the discharged ink is substantially the same as the volume of the unit grille UG.

G. Modifications

Modification 1

In the above embodiments, the three-dimensional modeling apparatus 100 colors the outermost periphery of a three-dimensional object, but clear ink for protecting a colored portion may be discharged onto the outer periphery side of the colored portion.

Modification 2

A value for discharging white ink may be stored at inner coordinates that are adjacent to the adjacent coordinates in the bitmap data. If the white ink is arranged at the coordinates inward of the adjacent coordinates, the ground color becomes white, and thus it is possible to improve the reproducibility of the color that is added. In addition, colorless ink arranged inward of colored ink in the depth direction may be white ink instead of clear ink. If the colorless ink arranged inside is white ink, the ground color can be white, and thus gradation expression using the colored ink can be more accurately performed.

Modification 3

A configuration may be adopted in which the three-dimensional modeling apparatus 100 colors only a side surface of an object by causing colored ink to be discharged into the unit grille UG1a and the unit grille UG2b (FIG. 4), and does not color the bottom surface of the objet by not causing colored ink to be discharged into the unit grille UG1c and the unit grille UG2d. Conversely, a configuration may also be adopted in which the bottom surface of the object is colored and a side surface is not colored.

Modification 4

The alignment orders of the nozzle groups for discharging colored ink in these embodiments are examples, and are not limited by the above embodiments. In other words, in the above embodiments, ink of arbitrary color can be replaced by other ink of arbitrary color.

Modification 5

In the above embodiments, the head unit 50 relatively moves in the Z direction by the modeling stage 11 moving in the Z direction. However, the position of the modeling stage 11 may be fixed and the head unit 50 may be moved directly in the Z direction. In addition, the head unit 50 moves in the X direction and the Y direction in the above embodiments, but the position of the head unit 50 may be fixed in the X direction and the Y direction, and the modeling stage 11 may be moved in the X direction and the Y direction.

Modification 6

In the above embodiments, out of three-dimensional modeling processes shown in FIG. 3, the processes of steps S10 to S40 are executed by the computer 200. However, those processes may be executed by the three-dimensional modeling apparatus 100. That is, the three-dimensional modeling apparatus 100 may execute all the processes from the acquisition of polygon data to the modeling of a three-dimensional object by itself. In addition, in the above embodiments, the process of step S50 shown in FIG. 3 is executed by the control unit 70 of the three-dimensional modeling apparatus 100. However, the process of step S50 may be executed by the computer 200 controlling the units of the three-dimensional modeling apparatus 100. That is, the computer 200 may perform the functions of the control unit 70 of the three-dimensional modeling apparatus 100.

The invention is not limited to the above embodiments, examples, and modifications, and can be achieved in various configurations without departing from the gist of the invention. For example, the technical features in the embodiments, examples, and modifications corresponding to the technical features in the modes can be replaced or combined as appropriate in order to solve some or all of the problems described above, or in order to achieve some or all of the aforementioned effects. Technical features that are not described as essential in the specification can be deleted as appropriate.

The entire disclosure of Japanese patent No. 2015-050168, filed Mar. 13, 2015 is expressly incorporated by reference herein.

What is claimed is:

1. A three-dimensional modeling apparatus for modeling a three-dimensional object by laminating a plurality of cross section bodies in a Z direction, the three-dimensional modeling apparatus comprising:
    a head unit for modeling the object by discharging a liquid that is to be a material of the object into each unit grille that is defined in accordance with a modeling resolution of the cross section body in an X direction, a modeling resolution of the cross section body in a Y direction, and a lamination interval of the cross section body in the Z direction; and
    a control unit for controlling the head unit,
    wherein the head unit is capable of individually discharging, into the unit grille, a colorless liquid and a plurality of types of colored liquids for expressing a designated color, and
    the control unit controls the head unit so as to discharge a designated type of colored liquid out of the plurality of types of colored liquids into a first unit grille positioned on a surface side of the object out of two unit grilles adjacent to each other in a direction from a surface of the object to the interior, and discharge, into a second unit grille positioned on an inner side of the object out of the two adjacent unit grilles, one or more types of colored liquids that includes at least one colored liquid of the same type as the colored liquid discharged into the first unit grille, so as to be able to express a color of the surface of the object using the colored liquid discharged into the first unit grille and the one or more colored liquids discharged into the second unit grille.

2. The three-dimensional modeling apparatus according to claim 1,
    wherein the unit grille has a plurality of sub unit grilles aligned in the Z direction,
    the head unit is capable of discharging a designated amount of each of the colorless liquid and the plurality of types of colored liquids into each of the sub unit grilles, and
    the control unit controls the head unit so as to discharge a designated type of colored liquid out of the plurality of types of colored liquids into each of the sub unit grilles, and in a case where the spatial volume of the sub unit grille is not filled with the colored liquid, controls the head unit so as to discharge the colorless liquid into the sub unit grille in addition to the colored liquid such that the spatial volume of the sub unit grille is filled.

3. The three-dimensional modeling apparatus according to claim 2,
    wherein the unit grille has a first sub unit grille and a second sub unit grille positioned above the first sub unit grille in the vertical direction,
    the head unit discharges the liquids into the unit grilles while scanning in a predetermined direction, and is provided with a plurality of nozzle groups for discharging the liquids, and
    in a main scanning direction of the head unit, a second nozzle group for discharging the colorless liquid into the first sub unit grille is arranged rearward of a first nozzle group for discharging a colored liquid into the first sub unit grille, a third nozzle group for discharging a colored liquid into the second sub unit grille is arranged rearward of the second nozzle group, and a fourth nozzle group for discharging a colorless liquid into the second sub unit grille is arranged rearward of the third nozzle group.

4. The three-dimensional modeling apparatus according to claim 1, wherein the head unit discharges the liquids into the unit grilles while scanning in a predetermined direction, and is provided with a plurality of nozzle groups for discharging the liquids, and in the main scanning direction of the head unit, a sixth nozzle group for discharging a colorless liquid into the unit grilles is arranged rearward of a fifth nozzle group for discharging a colored liquid into the unit grilles, and a seventh nozzle group for discharging a colorless liquid into the unit grilles is arranged rearward of the sixth nozzle group.

5. The three-dimensional modeling apparatus according to claim 1, wherein the control unit controls the head unit so as to discharge the colorless liquid and the colored liquids such that top portions of the liquids discharged into the first unit grille and the second unit grille are formed of the colorless liquid.

6. A method for manufacturing a three-dimensional object using a three-dimensional modeling apparatus for modeling a three-dimensional object by laminating a plurality of cross section bodies in a Z direction, the three-dimensional modeling apparatus including a head unit for modeling the object by discharging a liquid that is to be a material of the object into each unit grille that is defined in accordance with a modeling resolution of the cross section body in an X direction, a modeling resolution of the cross section body in a Y direction, and a lamination interval of the cross section body in the Z direction, and the head unit being capable of individually discharging, into the unit grille, a colorless liquid and a plurality of types of colored liquids for expressing a designated color, the method comprising controlling the head unit so as to discharge a designated type of colored liquid out of the plurality of types of colored liquids into a first unit grille positioned on a surface side of the object out of two unit grilles adjacent to each other in a direction from a surface of the object to the interior, and discharge, into a second unit grille positioned on an inner side of the object out of the two adjacent unit grilles, one or more types of colored liquids that includes at least one colored liquid of the same type as the colored liquid discharged into the first unit grille, so as to be able to express a color of the surface of the object using the colored liquid discharged into the first unit grille and the one or more colored liquids discharged into the second unit grille.

\* \* \* \* \*